United States Patent
Alsobrooks et al.

(10) Patent No.: US 6,844,541 B2
(45) Date of Patent: Jan. 18, 2005

(54) RAPID HIGH RESOLUTION POSITION SENSOR FOR AUTO STEERING

(75) Inventors: Richard Alsobrooks, Livingston, MI (US); Richard Graham, Jr., Oakland, MI (US); Thomas Wand, Wayne, MI (US); Roland Ruegenberg, Bad Sobernheim (DE); Vladimir Karasik, Walled Lake, MI (US); Michael Shahan, Allen Park, MI (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 10/075,562

(22) Filed: Feb. 15, 2002

(65) Prior Publication Data

US 2004/0173734 A1 Sep. 9, 2004

(51) Int. Cl.[7] .................................................. G01D 5/34
(52) U.S. Cl. .................................. 250/231.13; 250/239
(58) Field of Search .......................... 250/239, 231.18, 250/231.13, 231.14, 231.17; 356/616, 617; 341/11, 13; 33/707

(56) References Cited

U.S. PATENT DOCUMENTS

| | | | | |
|---|---|---|---|---|
| 3,824,587 A | * | 7/1974 | Fowler | 341/10 |
| 4,041,483 A | * | 8/1977 | Groff | 341/9 |
| 4,420,754 A | | 12/1983 | Andermo | |
| 4,697,144 A | | 9/1987 | Howbrook | |
| 4,879,508 A | | 11/1989 | Andermo | |
| 5,023,559 A | | 6/1991 | Andermo | |
| 5,142,225 A | | 8/1992 | Gerlach et al. | |
| 5,198,763 A | | 3/1993 | Konishi | |
| 5,252,825 A | * | 10/1993 | Imai et al. | 250/231.18 |
| 5,365,791 A | | 11/1994 | Padula et al. | |
| 5,640,007 A | * | 6/1997 | Talbott et al. | 250/231.15 |
| 5,789,915 A | | 8/1998 | Ingraham | |
| 5,818,038 A | * | 10/1998 | Kerkmann et al. | 250/231.13 |
| 5,901,458 A | | 5/1999 | Andermo et al. | |
| 5,955,881 A | | 9/1999 | White et al. | |
| 5,973,494 A | | 10/1999 | Masreliez et al. | |
| 6,057,682 A | | 5/2000 | McCurley et al. | |
| 6,118,283 A | | 9/2000 | Cripe | |
| 6,130,425 A | * | 10/2000 | Sano | 250/231.14 |
| 6,248,993 B1 | * | 6/2001 | Bunselmeier et al. | 250/231.13 |
| 6,459,389 B1 | * | 10/2002 | Germuth-Loffler et al. | 341/13 |
| 6,483,104 B1 | * | 11/2002 | Benz et al. | 250/231.13 |
| 6,541,760 B2 | * | 4/2003 | Ohgoshi et al. | 250/231.13 |

OTHER PUBLICATIONS

Position Sensor Design, Presentation to Chrysler Corp. Aug. 30, 2000.

* cited by examiner

*Primary Examiner*—Que T. Le
(74) *Attorney, Agent, or Firm*—Blank Rome LLP (57) ABSTRACT

A position sensor for determining the angular position of a steering wheel. The shaft of the steering wheel is connected to a code disk and turn ring of the sensor so that when steering wheel is rotated, the coded disk and turn ring are also rotated. The code disk is a flat circular disk having a series of cut-outs or bits around its perimeter. A light emitting diode shines a light through the cut-outs and is read by a photo detector which determines the angular position of the code disk. The turn ring is fitted on the outside of the code disk and rotates in a hypocycloidic circle so that for every full revolution of the code disk, the turn ring rotates through a smaller angle. The turn ring is placed over a series of Hall sensors to determine the number of revolutions of the code disk.

10 Claims, 7 Drawing Sheets

RAPID HIGH RESOLUTION POSITION SENSOR FOR AUTO STEERING

FIELD OF INVENTION

The present invention is directed towards an electromechanical position sensor for a power steering mechanism. The sensor uses a coded disk and turn ring to indicate the direction of rotation, the acceleration of rotation, and the absolute angular position of a steering wheel. The information may be used to adjust other systems in an automobile, such as its suspension system, to provide for optimal ride and safety performance.

BACKGROUND OF THE INVENTION

Traditional power steering mechanisms use hydraulic systems to provide their energy. Unfortunately, hydraulic systems must be constantly powered to function properly, placing a drain on an automobile's power system and lowering its fuel efficiency. Additionally, hydraulic steering systems are generally isolated and do not provide steering wheel position information to other systems in an automobile.

Steering wheel position information can be used to adjust an automobile's suspension system, dampening the automobile's shock absorbers to provide a smoother ride, along with compensating for body pitching and yawing due to turns, acceleration or deceleration. To perform these functions, steering wheel position sensors that give advanced input to the controller for anticipatory responses are necessary. Currently available sensors have several drawbacks including their lack of resolution, accuracy, response time, and durability. Also, their large size and high cost of manufacture limit their use in today's automobiles. There have been some recent inventions attempting to overcome these limitations.

U.S. Pat. Nos. 4,420,754 and 4,879,508 to Adermo discuss a capacitive type measurement apparatus for making absolute measurements of position. These patents define a large and continuous array of transmitter electrodes and receiver electrodes from which a ratio of relationships of both the amount of travel and the energizing wave fundamentals provides a signal relative to the position of travel. The systems disclosed in these patents read a fixed series of points as movement takes place. From a select group of these points a number of differing wavelengths are received for measurement. The signals received are then deciphered to determine the position being read. The deciphering electronics are rather complicated and require a significant number of logic and amplifier elements as well as a microprocessor U.S. Pat. No. 4,697,144 to Howbrook discloses a position sensor that uses an array of coils with differing phase shifts applied to them. There is a pickup that receives the signals from one or more of these fixed and defined points dependent of the position and resolves the position from the signals received. The sensor coils are used for an inductive stepped measurement system.

U.S. Pat. No. 5,955,881 to White et al., U.S. Pat. No. 6,057,682 to McCurley et al. U.S. Pat. No. 5,198,763 to Konishi, U.S. Pat. No. 5,142,225 to Gerlach, U.S. Pat. No. 5,789,915 to Ingraham and U.S. Pat. No. 5,365,791 to Padula disclose a linear measurement system that uses one or more magnets and one or more Hall element sensors to provide a non-contacting position sensor, using magnetic flux and the coupling of such, as the varying property with which sensing occurs. These patents also describe rotary sensors using this technique.

U.S. Pat. No. 6,118,283 to Cripe discloses a capacitive rotary position sensor in which quadrate signals are coupled by position to produce a phase variance to be compared to a reference signal to produce an analog output representation of the rotary position.

SUMMARY OF THE INVENTION

The present invention is directed to a position sensor for determining the rotational position of a steering wheel. The position sensor includes a circular hub that is attached to the steering wheel's shaft, a code disk and a turn ring, contained within a housing having a base and a cover. The code disk is fixed to the hub so that its rotation is identical to that of the hub. The turn ring is also placed on the hub, but is free to rotate independently of the hub.

The code disk is a flat circular disk having a series of cut-outs around its perimeter, with a predetermined number of cut-outs identifying a position. The cut-outs are arranged so that each position around the code disk is identified by a unique arrangement of cut-outs. A light emitting diode shines a light through the cut-outs and is read by a photo detector to determine the rotational position of the code disk.

The turn ring has a magnet on its outside perimeter that energize Hall sensors on a PC board. As the hub rotates, it forces gear teeth on the turn ring to mesh with gear teeth on the cover, rotating the turn ring in a hypocycloidic path around the hub. For each full turn of the hub, the turn ring rotates through only a fraction of a full turn. Therefore, depending on which Hall sensors are energized by the magnet, the PC board is able to determine the direction and number of revolutions of the hub. The information from the code disk and turn ring are transmitted to a microchip which then determines the absolute rotational position of the steering wheel.

DETAILED DESCRIPTION OF THE PREFERRED EMBODIMENTS OF THE INVENTION

Referring now to the several drawing figures in which identical elements are numbered identically throughout, a description of the preferred embodiments of the present invention will be provided.

Figure 1:
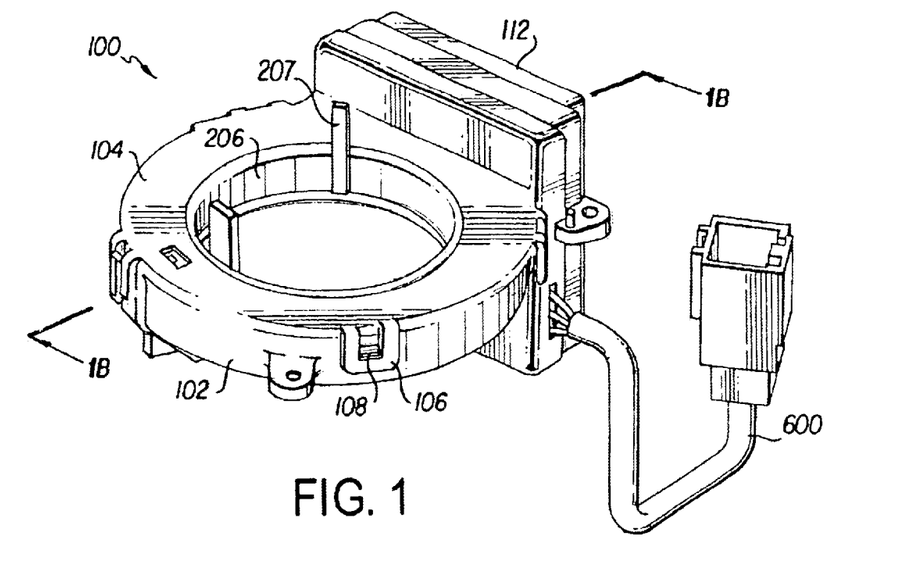
FIG. 1 shows a perspective view of a first embodiment of a position sensor in an assembled state.
Figure 1A:
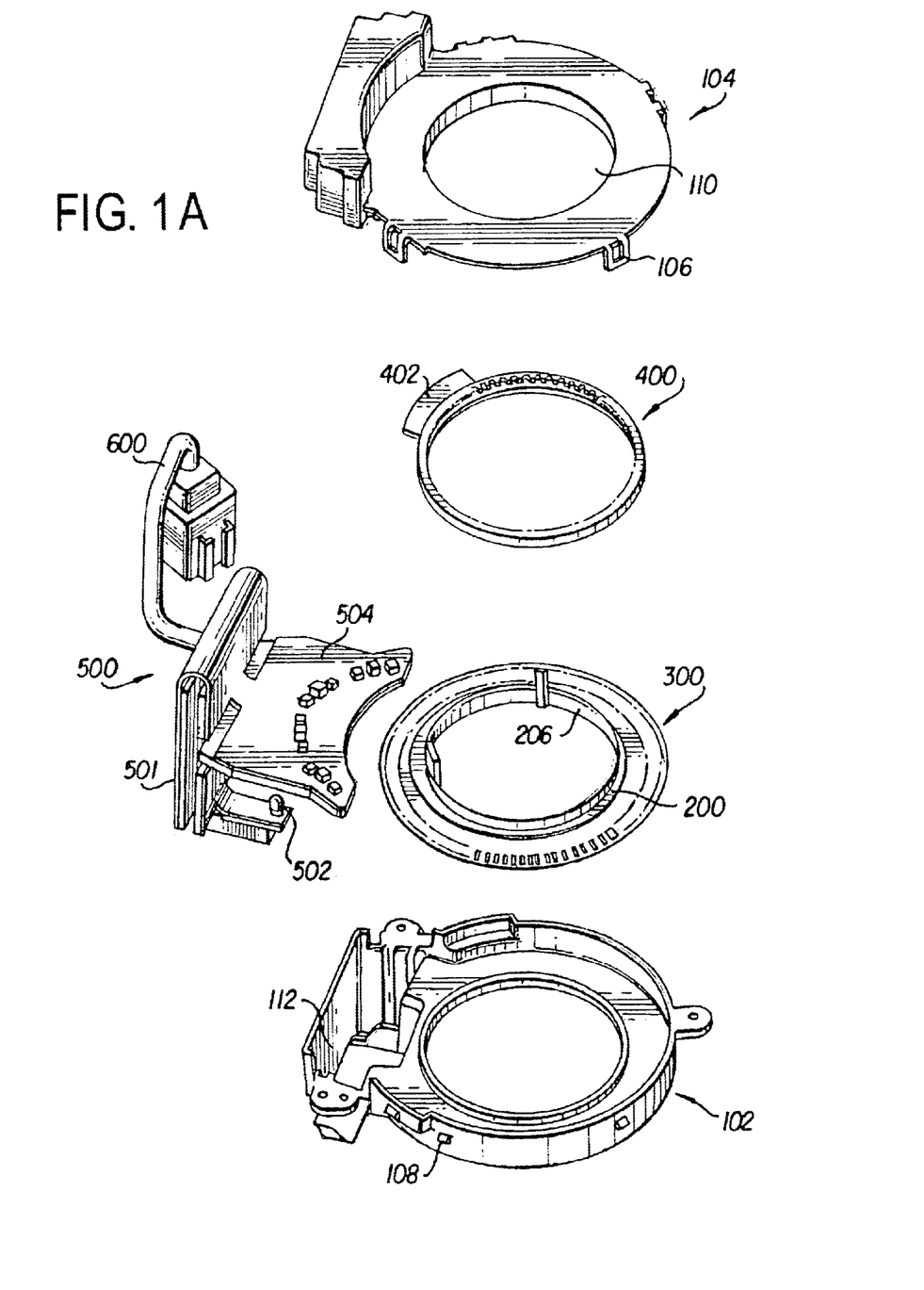
FIG. 1A shows an exploded view of the first embodiment of the position sensor.

FIG. 1 shows a perspective view of an assembled position sensor 100. FIG. 1A shows a position sensor 100 of the first preferred embodiment of the present invention in an exploded view with each of the components shown separately. The housing of the position sensor 100 has a base 102 and a cover 104 which hold the various components of the sensor therein. For convenience and clarity, the direction facing the cover 104 will be referred to as the "top" or "up" direction and the direction facing the base 102 will be referred to as the "bottom" or "down" direction. The use of this terminology is not intended as a limitation on the scope of the invention.

The base 102 and the cover 104 are generally circular, with the cover 104 being slightly larger and fitting over the base 102. The cover 104 has rectangular-shaped clasps 106 extending downward and sliding over angled studs 108 protruding from the base 102 to lock the cover 104 to the base 102, as shown in FIG. 1. The base 102 and the cover 104 define an interior space that hold the components of the position sensor 100, namely a hub 200, a code disk 300, a turn ring 400, and a flexible print circuit (PC) board 500.

To one side of the base 102 is a receptacle 112 for holding the flexible PC board 500, which includes a microprocessor chip 524, Hall sensors 506, 508, 510 and 512, and a photo detector 526. As shown in greater detail in FIGS. 5 and 5A, the PC board 500 includes a single ribbon cable 503 that is folded over at various points to produce a main panel 501, and a sensor panel 504 extending generally perpendicular to the main panel 501. Rigid support members 516, 518, 520 and 522 are attached to the back of the ribbon cable 503 so that the PC board 500 retains its shape. The Hall sensors 506, 508, 510 and 512 are placed on a first end of the ribbon cable 503, the microprocessor chip 524 is placed in the middle of the ribbon cable 503, and the photo detector 526 at a second end of the ribbon cable 503. When folded, the microprocessor 524 defines the main panel 501, and the Hall sensors 506, 508, 510 and 512 and photo detector 526 define the top and bottom surfaces of the sensor panel 504, respectively.

Figures 5, 5A:
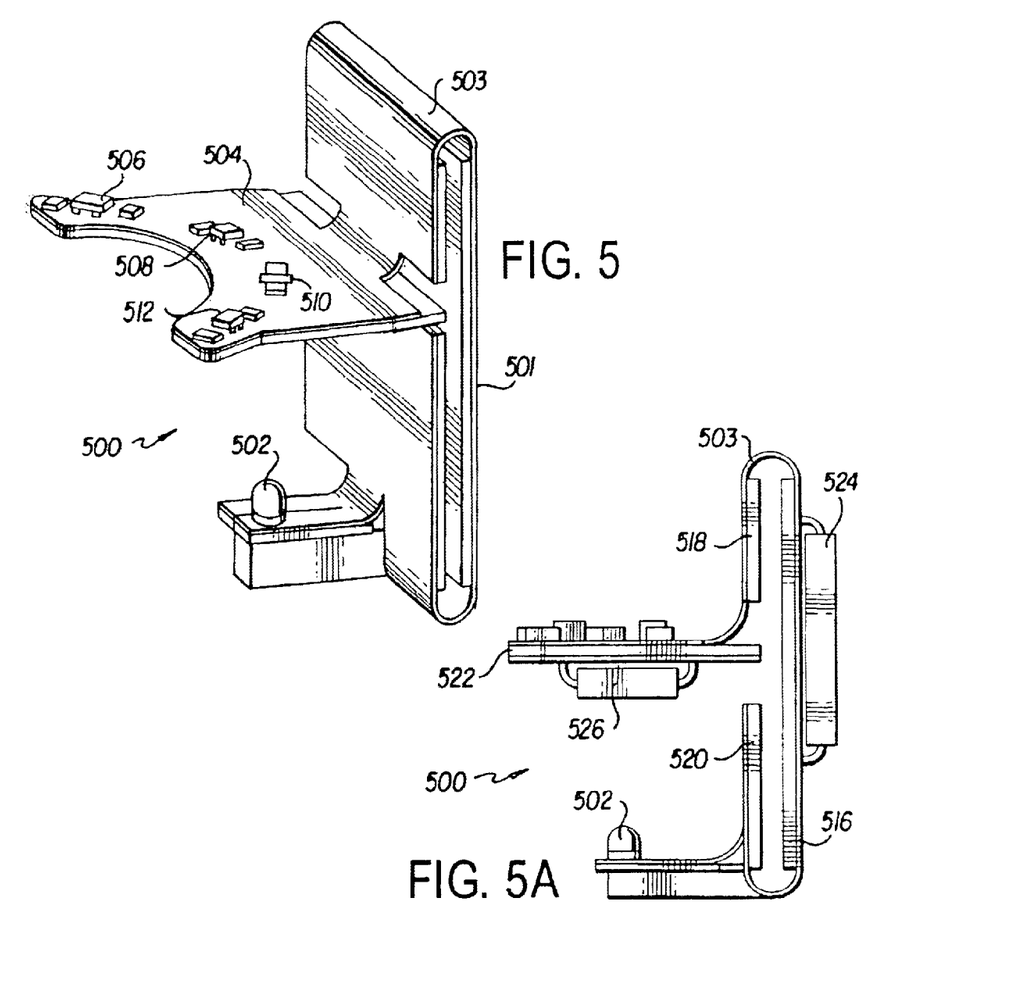
FIG. 5 shows a perspective view of the first embodiment of a flexible PC board.
FIG. 5A shows a side view of the flexible PC board of FIG. 5.

The single ribbon flexible PC board 500 provides the ability to add functions to the position sensor 100 by adding microprocessors onto unused portions of the flexible ribbon cable 503 or interchanging the microprocessor. This feature is highly desirable since space constraints in the steering column typically limit the size of the sensor 100. Additionally, the flexible ribbon cable 503 allows the PC board 500 to be reconfigured into different shapes to fit into other possible sensor designs.

A light emitting diode (LED) 502 is attached to the bottom of the main panel 501 and extends parallel to the sensor panel 504 so that its light shines onto the photo detector 526. The PC board 500 is placed into the receptacle 112 so that the sensor panel 504 and LED 502 extend into the circular portion of the base 102.

The hub 200 has extensions 207 that are snapped onto spring coils (not shown) in a steering column. The hub 200 is placed into the base 102, generally in between the LED 502 and the sensor panel 504. An inner diameter of the hub 206 fits inside an opening 110 of the cover 104, as seen in FIGS. 1 and 1A. The base 102, hub 200 and cover 104 are preferably made of a thermoplastic material to minimize the frictional resistance between the components. However, other materials or designs, such as a bearing assemblies, may be used to reduce the friction between the components.

Figure 2:
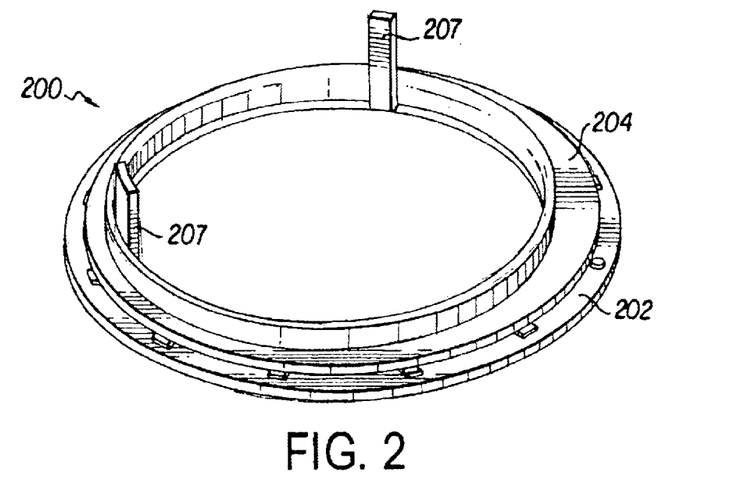
FIG. 2 shows a perspective view of the first embodiment of a hub.

The hub 200, shown in FIG. 2, contains two ledges, a first ledge 202 for supporting the code disk 300 and turn ring 400, and a second ledge 204 to drive the rotation of the turn ring 400, as explained later. The hub's inner diameter 206 and first ledge 202 have concentric centers of rotation. The hub's second ledge 204 is off-center, with one side extending farther out than the other.

Figure 3:
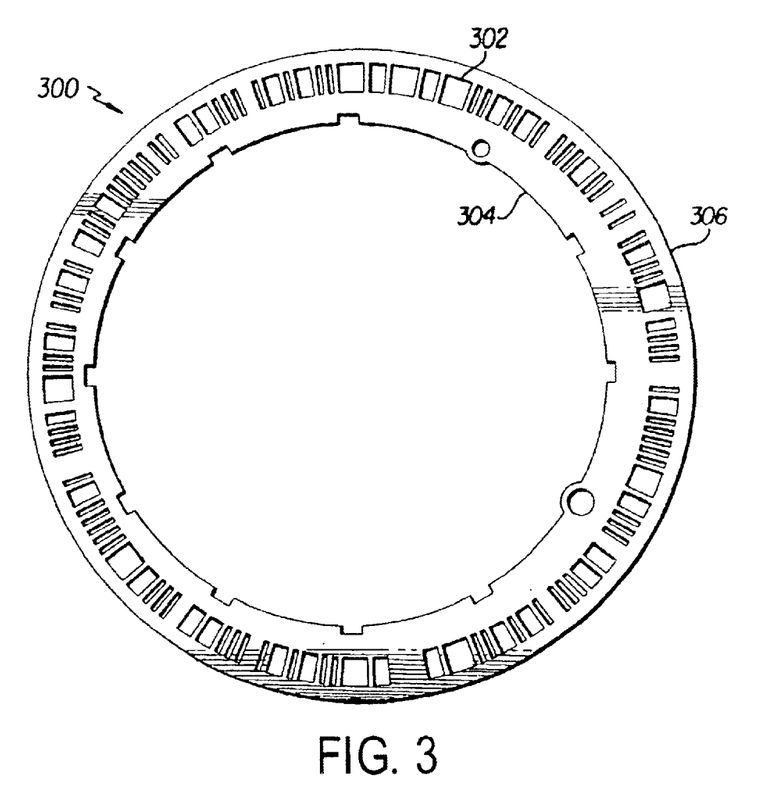
FIG. 3 shows a perspective of the first embodiment of a code disk.

The code disk 300 is rigidly fixed to the hub 200 first ledge 202 so that its center of rotation is concentric with the hub's inner diameter 206, as shown in FIG. 3. The code disk 300 may be attached to the hub 200 using one of a number of known methods, such as gluing or insert molding. The thin side of the code disk 300 is placed adjacent the extended portion of the second ledge 204. This compensates for the off-centered nature of the second ledge 204 and allows the code disk 300 to have the same center of rotation as the hub's inner diameter 206. Alternatively, the hub 200 and the code disk 300 may be made as a single component instead of being manufactured separately and joined together.

The code disk 300 has a series of cut-outs 302 around its circumference representing the rotational position of the code disk 300. The code disk 300 may be made from any suitable material, however, it is preferred that it be made of a metal because of its low cost, high strength, and relative ease of manufacture. Although the preferred embodiment of the code disk is disclosed with cut-outs 302, other types of markings may be used to represent the rotational positions. For example, the code disk may be made from a transparent material, with dark lines placed around its circumference.

When the position sensor is assembled, the cut-outs 302 are located in between the LED 502 and the sensor panel 504 so that the light from the LED 502 shines through the cut-outs 302 and is read by the photo detector 526. The cut-outs 302 around the circumference of the code disk 300 form a unique pattern over a predetermined portion of the circumference, each unique pattern identifying a specific rotational position. More specifically, in the preferred embodiment, the circumference of the code disk 300 comprise 512 equally sized spaces or bits that form the unique patterns. The sizing of the bits determines the rotational resolution of the code disk 300, which in this case is 0.7 degrees (360 degrees divided by 512). The cut-outs are arranged so that any series of 9 bits on the code disk is unique and identifies a unique position on the code disk 300, in what is known as maximal length sequence.

The light from the LED 502 passes through the cut-outs 302 and is read by the photo detector 526, which in the preferred embodiment is a charge coupling device. The photo detector 526 reads the sequence of bits by first finding a reference point where a transition from light to dark occurs. Each bit is represented by 8 pixels, 6 or less of which are required to identify a bit. The reference point then gives a stream of pixels which represent the current position. Because the photo detector reads more pixels than necessary to identify a position, a shift of a non-fractional degree angle does not effect the ability of the photo detector to recognize each of the bits in the sequence. The ability to detect more than the necessary number of pixels provides a back-up or fail safe mechanism to ensure the accuracy of the readings.

The photo detector 526 samples a continuous stream of positions as the code disk 300 is rotated. A new image is read as soon as the previous image is serially clocked out, and rapid and repetitive readings produce a running indication of the position and acceleration of the code disk 300. How fast the photo detector 526 samples the code disk 300 depends on the technology available and the accuracy needed. To assist the photo detector 526 in reading the code disk 300, the LED 502 is strobed so that its flashes are timed to occur precisely when the previous image has cleared the photo detector 526. This feature allows the photo detector 526 to read images much faster without corrupting the image due to blurring, as happens when trying to take a photograph of a moving object with a slow shutter.

The photo detector 526 transmits the bit sequence to the microprocessor 524 which interprets the information to determine the rotational position of the code disk 300. For added accuracy and precision, the photo detector 526 oversamples the code disk 300 and reads more than the 9-bits necessary to determine a true position. The additional bits provide the positions before and after the true position to ensure that a continuous series of positions are read. In the preferred embodiments, the photo detector 526 reads 11-bits, an extra bit to both sides of the true 9-bit position. The extra bit to the left of the true position combined with the next 8-bits provides the position to the immediate left of the true position. Similarly, the extra bit to the right of the true position, combined with the previous 8-bits provides the position to the immediate right of the true position. The microprocessor 524 then compares the left and right position information to check the accuracy of the true position.

It should be understood that the number of bits around the code disk 300 and the number of bits read by the photo detector 526 are not meant to limit the scope of the invention, but are provided as an example of a preferred embodiment of the invention. Modifications to the number of bits on the code disk 300 and the number of bits read by the photo detector 526 may be made without departing from the spirit and scope of the invention.

The position of the code disk 300 provides only the relative rotational position of the hub 200. The sensor 100 cannot determine the absolute position of the hub from the code disk 300 alone because the code disk repeats itself after rotating 360 degrees. The sensor 100 would not be able to distinguish between a rotation of 90 degrees and one of 450 degrees. Therefore, a turn ring 400 is provided to determine whether the code disk 300 undergoes any revolutions.

Figure 1B:
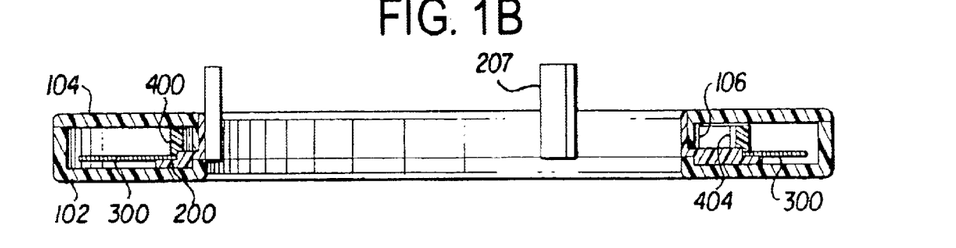
FIG. 1B shows a side cut-away view along line 1B—1B of FIG. 1.
Figure 1C:
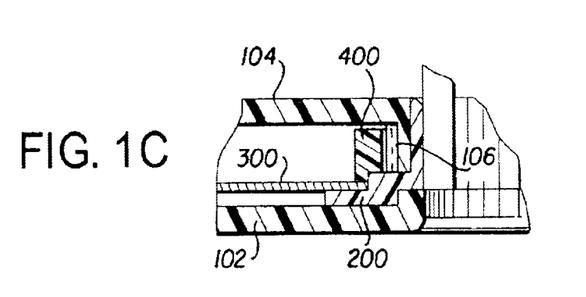
FIG. 1C shows a detailed view of section 1C—1C of FIG. 1B.
Figure 4:
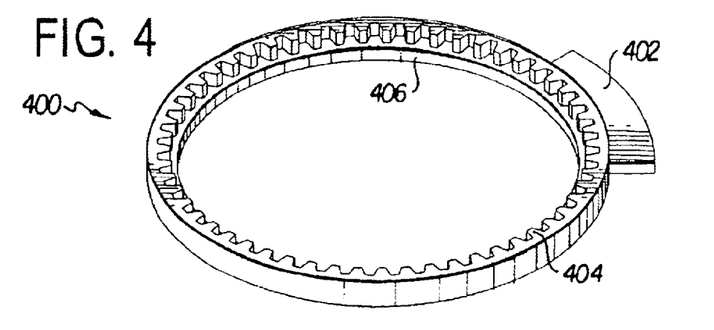
FIG. 4 shows a perspective view of the first embodiment of a turn ring.

The turn ring 400 has a base 406 and a series of teeth 404 above the base 406, as shown in FIG. 4. The turn ring 400 is placed on top of the code disk 300, with the base 406 of the turn ring 400 fitting securely around the second ledge 204. The teeth 404 of the turn ring 400 are above the second ledge 204 and are free to engage corresponding teeth 106 on the inside of the cover 104, as shown in greater detail in FIGS. 1B and 1C. However, the diameter of the turn ring 400 is slightly larger than the inside diameter of the cover so that at any given moment, only a portion of the turn ring 400 is engaged with the cover 104. This can be seen in FIG. 1B, where on the left side of the sensor 100 the teeth 404 of the turn ring 400 are engaged with the teeth 106 of the cover 104, and on the right side of the sensor the teeth 404 of the turn ring 400 are disengaged from the teeth 106 of the cover 104.

Figure 6A:
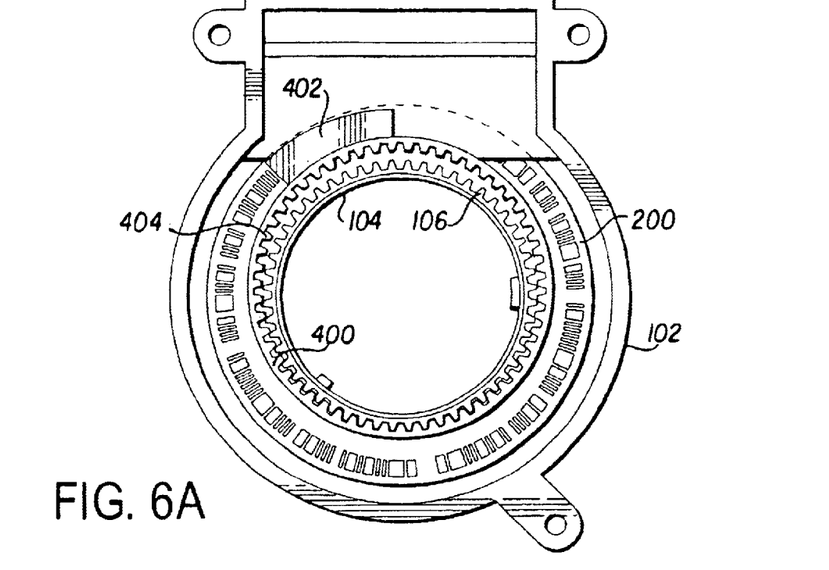
FIG. 6A shows a top view of the first embodiment of the turn ring to the left of the neutral position.
Figure 6B:
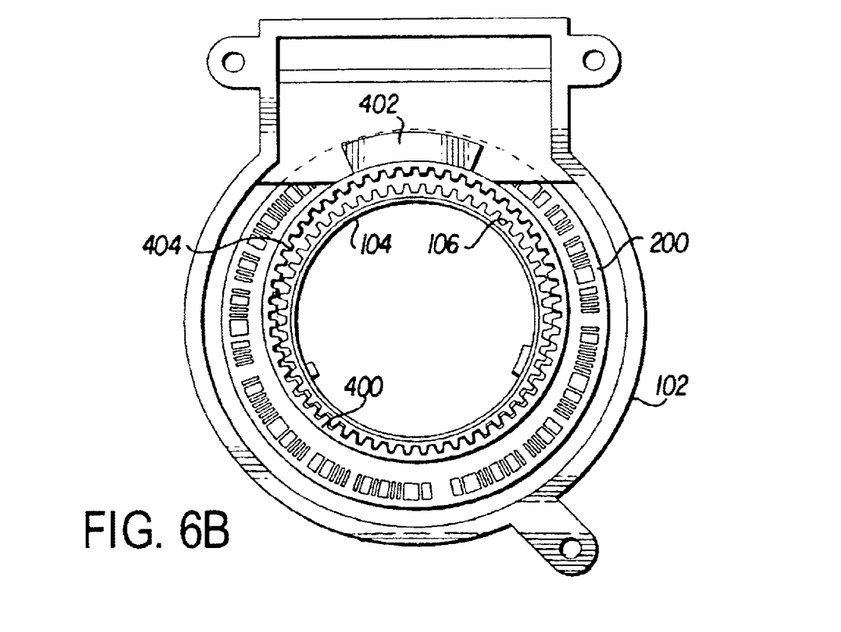
FIG. 6B shows a top view of the first embodiment of the turn ring at the neutral position.
Figure 6C:
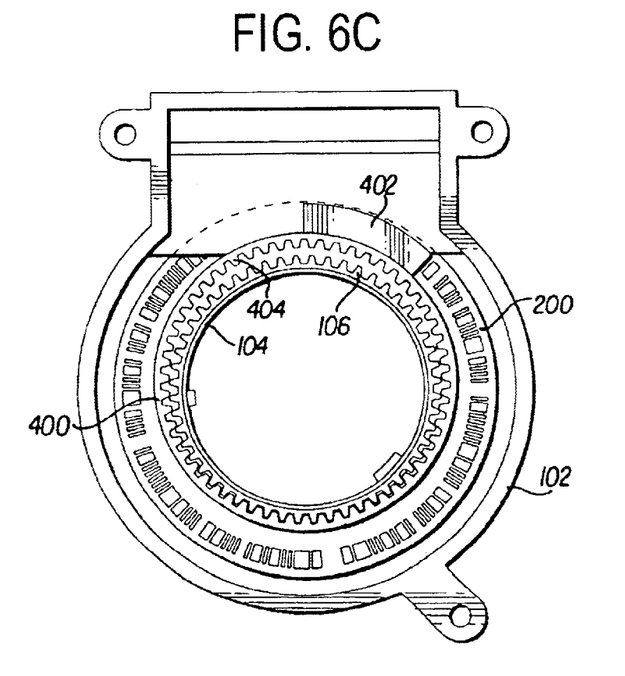
FIG. 6C shows a top view of the first embodiment of the turn ring to the right of the neutral position.

FIGS. 6A–6C show the relationship between the turn ring 400, the hub 200 and the cover 104 in greater detail. The figures show the teeth 404 of the turn ring 400 meshing with the teeth 106 of the cover 104 along a portion of the cover. The remainder of the teeth 404 and 106 are disengaged from one another creating a crescent-shaped space between the turn ring 300 and the cover 104.

As the hub 200 rotates, the second ledge 204 continually pushes the base 406 of the turn ring 400 outward, so that the turn ring's teeth 404 run around the teeth 106 of the cover 104, and the contact point between the turn ring 400 and the cover 104 moves around the cover 104 in parallel with the rotation of the hub 200. FIGS. 6A–6C show the contact point as it moves around the cover 104. FIG. 6A shows the contact point just to the right of the center point, FIG. 6B shows the contact point at the center point, and FIG. 6C shows the contact point to just left of the center point.

The relative rotational rate is controlled by the gear ratio between the turn ring 400 and the cover 104, which in the preferred embodiment is 18 to 1. A magnet 402 on the outer periphery of the turn ring 400 extends over the Hall sensors of the sensor panel 504. Therefore, for every full rotation of the hub 200, the turn ring 400 rotates 20.0 degrees (360 degrees divided by 18). This keeps the magnet 402 over the Hall sensors through multiple revolutions of the hub 200.

The magnet 402 energizes the Hall sensors 506, 508, 510 and 512, as shown in Table 1 below.

TABLE 1

| Rotational Position of code disk (in revolutions) | Hall Sensor 506 | Hall Sensor 508 | Hall Sensor 510 | Hall Sensor 512 |
|---|---|---|---|---|
| 0.0 | L | L | L | L |
| 0.5 | H | L | L | L |
| 1.0 | H | H | L | L |
| 1.5 | L | H | L | L |
| 2.0 | L | H | H | L |
| 2.5 | L | L | H | L |
| 3.0 | L | L | H | H |
| 3.5 | L | L | L | H |

The rotational position 0.0 represents the hub 200 and code disk 300 turned to its leftmost endpoint. The position is changed in increments of 0.5 revolutions or 180 degrees to the right until it reaches 3.5 revolutions. The zero or neutral position is therefore halfway between the 1.5 and 2.0 revolution position. The table shows the Hall sensors that are activated for each position. The "L" represents a low or zero magnetic field and "H" represents a high magnetic field. Because the Hall sensors are arranged to change their output for each half rotation, every full rotation will have two different Hall sensor readings. This ensures the accuracy of the number of revolutions traveled by the hub 200, either to the left or right.

The steering wheel is attached to the hub extensions 207 and rotates the hub 200, code disk 300 and turn ring 400 as described above. The photo detector 526 and the Hall sensors 506, 508, 510 and 512 obtain the position of the code disk 300 and turn ring 400, respectively, and send the information to the microprocessor 524 to determine the steering wheel's absolute position. This information is then transmitted to other systems in the automobile through a data cable 600, shown in FIG. 1.

Figure 7:
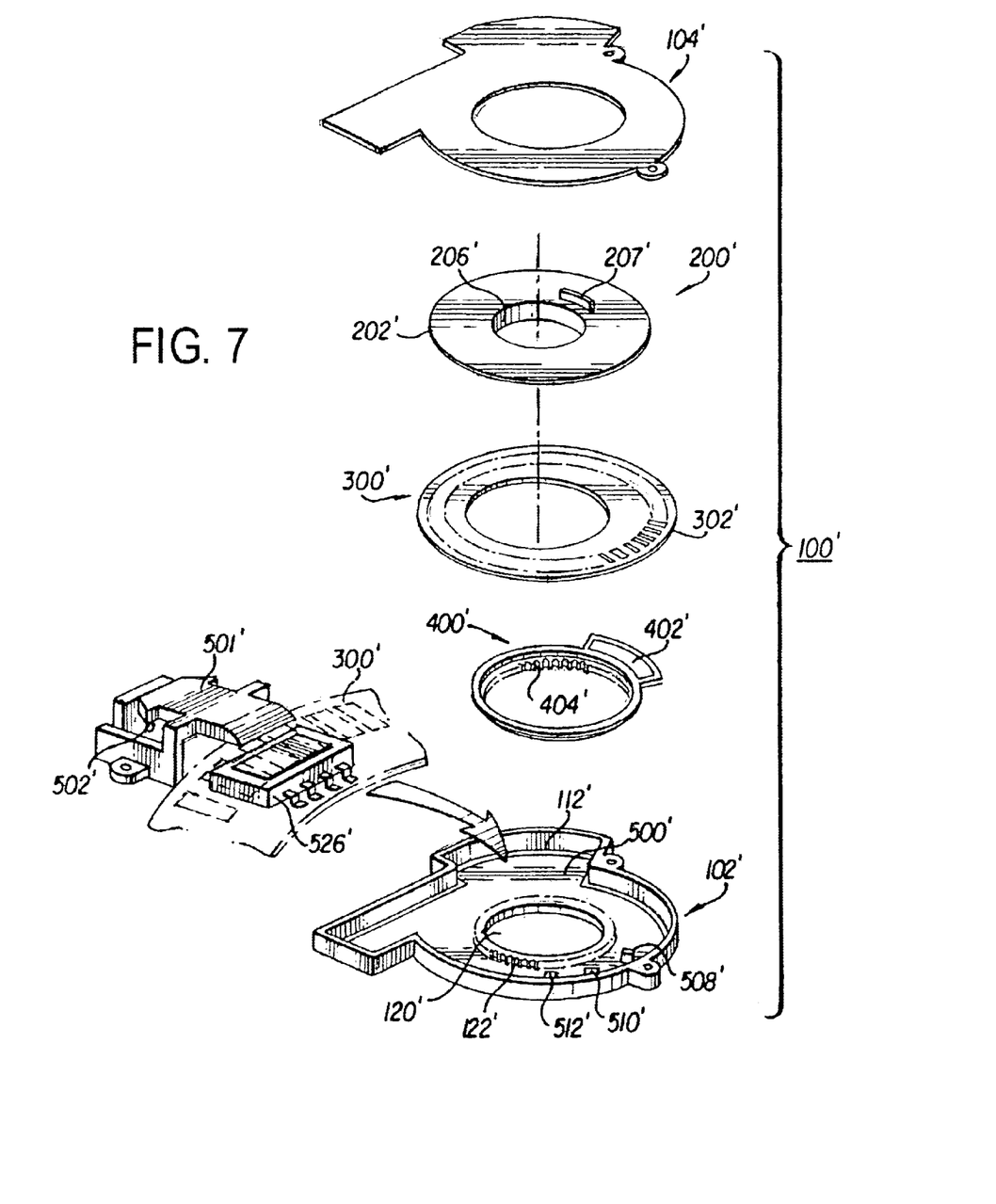
FIG. 7 shows an exploded perspective view of a second embodiment of the invention.
Figure 8:
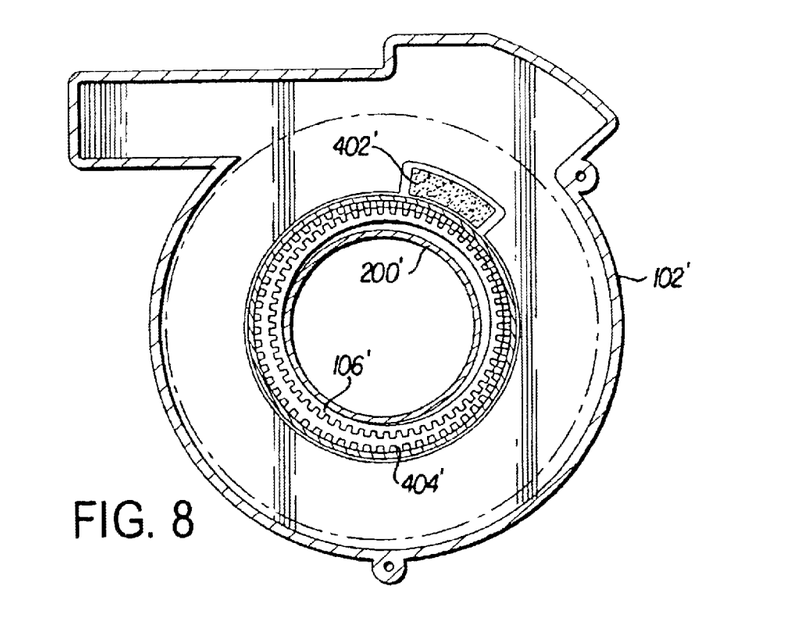
FIG. 8 shows a top cut-away view of the second embodiment.

FIGS. 7 and 8 show a second preferred embodiment of the invention which works on the same principles as the first preferred embodiment. Similar elements have been labeled with the same reference number with an apostrophe to distinguish between the embodiments.

The housing of the sensor 100' includes a base 102' and a cover 104'. Enclosed within the housing are, from top to bottom, the hub 200', the code disk 300', the turn ring 400' and the PC board 500'.

The PC board 500' contains the circuitry related to receiving and processing the position information for the sensor 100'. Four Hall sensors 506', 508', 510' and 512' are placed around its circumference, and a photo detector 526' is placed in a receptacle area 112'. A light pipe 501' is placed into the receptacle area 112' and uses mirrors to direct light from an LED) 502' onto the photo detector 526'. The code disk 300' is placed in between the light pipe 501' and the photo detector 526', so that the light travels from the top of the light pipe, past the bits 302' on the code disk 300', onto the photo detector 526'.

The relative movements of the hub 200', the code disk 300' and the turn ring 400' are based on the same principles as the preferred embodiment, however, the position of the components are slightly altered. Specifically, in this embodiment, gear teeth 122' are placed in the base 102' rather than in the cover 104'.

The base 102' has an opening 120' with gear teeth 122' around its inside diameter. The inner diameter of the turn ring 400' is larger than diameter of the opening 120', so that the turn ring's gear teeth 404' mesh with the gear teeth 122' at a single point, as seen in FIG. 8. A permanently fixed code disk 300' and hub 200' are placed on top of the turn ring 400'. The hub 200' has two ledges, a first ledge 202' for supporting the code disk 300', and a second ledge 204 for driving the rotation of the turn ring 400'. The inner diameter of the hub 206' extends down into the opening 120' and acts as a bearing between the hub 200' and the base 102'.

The steering wheel (not shown) of an automobile is attached to the hub 200' through hub extensions 207. As the hub 200' and attached code disk 300' rotate, the hub 200' forces the turn ring 400' to move around the opening 120' in a hypocycloidic path. A magnet 402' on the perimeter of the turn ring 400' energizes specific Hall sensors 506', 508', 510' and 512', depending on the extent of the rotation. Therefore, depending on the position of the code disk 300' and the turn ring 400', the absolute rotational position of the hub 200', and consequently the steering wheel is known.

It should be understood that although the description of the invention has been given in reference to a position sensor used in automobiles, the invention may be used in other systems where the angular position of a rotating member is needed. Furthermore, although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A rotational position sensor comprising;
a housing containing a hub including a generally circular shaped disk having a first ledge and a second ledge, a code disk including a generally circular shaped disk rigidly fixed to the first ledge of the hub, and a turn ring on the code disk having gear teeth that engage gear teeth on the housing.

2. The rotational position sensor of claim 1, further comprising;
a PC board including a photodetector that reads the rotational position of the code disk and a plurality of sensors that determine whether the code disk undergoes any revolutions.

3. The rotational position sensor of claim 2, wherein;
the code disk contains markings arranged around its circumference forming a unique pattern over a predetermined portion of the circumference, said unique pattern identifying a specific rotational position, and the photodetector reading the markings to identify the unique rotational position of the code disk.

4. The rotational position sensor of claim 3, further comprising;
a light source that shines a light through the markings in the code disk onto the photodetector.

5. The rotational position sensor of claim 4, wherein;
the markings are formed of cut-outs in the code disk.

6. The rotational position sensor of claim 3, wherein;
the markings comprise equally sized bits that form the unique pattern, each bit comprising a plurality of pixels, the plurality of pixels being more than the number of pixels necessary to define each bit so that the photo detector is able to oversample each bit to more reliably identify it.

7. The rotational position sensor of claim 2, wherein;
the turn ring has a magnet on its circumference that travels over the plurality of sensors, energizing specific sensors depending on the number of revolutions of the code disk.

8. The rotational position sensor of claim 7, wherein;
the second ledge drives the rotation of the turn ring in a hypocycloidic path around the gear teeth in the housing.

9. The rotational position sensor of claim 8, wherein;
the housing includes a cover and a base; and
the gear teeth in the housing are on the cover.

10. The rotational position sensor of claim 8, wherein;
the housing includes a cover and a base; and
the gear teeth in the housing are on the base.

* * * * *